April 5, 1966     O. W. RICHARDS ETAL     3,244,075
DISPERSIVE TYPE OPTICAL FILTER UTILIZING
LIGHT-TRANSMITTING FIBER ELEMENTS Filed Feb. 9, 1961     3 Sheets-Sheet 1

INVENTORS
OSCAR W. RICHARDS
ALVA H. BENNETT
BY
ATTORNEYS

April 5, 1966  O. W. RICHARDS ETAL  3,244,075
DISPERSIVE TYPE OPTICAL FILTER UTILIZING
LIGHT-TRANSMITTING FIBER ELEMENTS
Filed Feb. 9, 1961  3 Sheets-Sheet 2

INVENTORS
OSCAR W. RICHARDS
ALVA H. BENNETT
BY
*Louis L. Gagnon*
*James P. McFadden*
ATTORNEYS

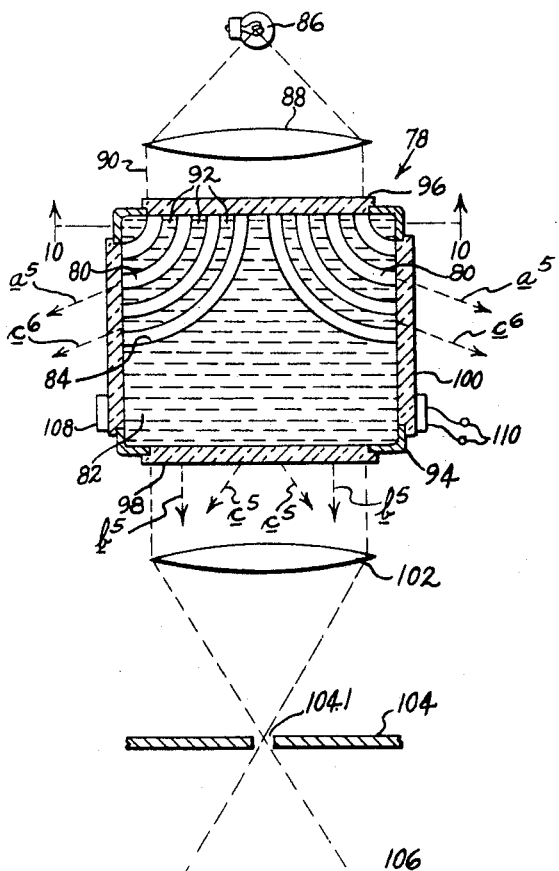
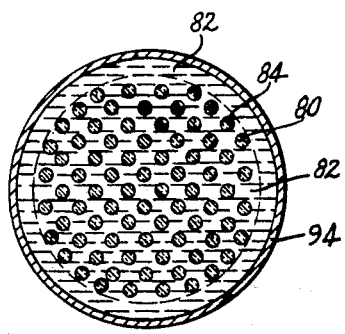
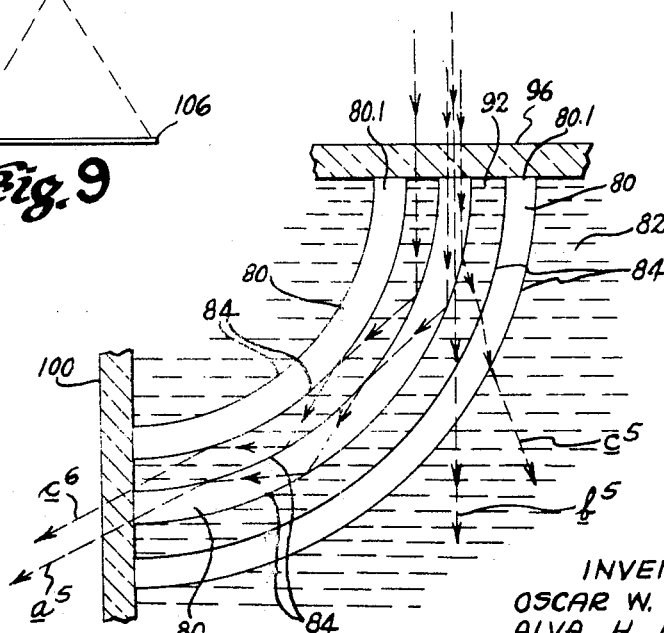

United States Patent Office 3,244,075
Patented Apr. 5, 1966

3,244,075
DISPERSIVE TYPE OPTICAL FILTER UTILIZING LIGHT-TRANSMITTING FIBER ELEMENTS
Oscar W. Richards, North Woodstock, and Alva H. Bennett, Thompson, Conn., assignors to American Optical Company, Southbridge, Mass., a voluntary association of Massachusetts
Filed Feb. 9, 1961, Ser. No. 88,174
5 Claims. (Cl. 88—106)

The field of this inveniton is that of light-filtering systems, and the invention relates, more particularly, to novel and improved methods and apparatus for providing a beam of light comprised of light of selected wavelengths.

Various light-absorptive filters and filters of the interference type are used in many different applications for providing selective light transmission, but, since such filters tend to restrict transmission of light of all wavelengths, often to a substantial extent, filter systems or illuminating systems incorporating such filters are generally quite inefficient. Another type of filter known as a Christiansen filter embodies a multiplicity of particles suspended in a liquid and is adapted to transmit substantially all light of a single selected wavelength. In this filter, the particles and liquid have a common index of refraction for light of the selected wavelength and have different dispersive powers so that light of the selected wavelength is transmitted through the filter without deviation whereas light of other wavelengths is variously refracted and reflected at random at interfaces between the particles and liquid. Such random refraction and reflection is adapted to provide a transmitted beam of light having a small core of undeviated light of the selected wavelength surrounded by light of the selected wavelength and other wavelengths. In order to provide a beam of relatively pure, monochromatic light of the selected wavelength by use of this filter, for example to provide monochromatic illumination for various purposes as in microscopy, a large part of this transmitted beam outside of the central core of the beam must be masked, thereby restricting transmission of a substantial part of the light of the selected wavelength so that a Christiansen filter system is also relatively inefficient.

It is an object of this invention to provide novel and improved methods and apparatus for providing a beam of light comprised of light of selected wavelengths; to provide such methods and apparatus which are relatively efficient in operation; to provide such methods and apparatus for segregating substantially all light of said selected wavelengths from a beam of light comprised of light of many wavelengths; to provide such methods which can be conveniently carried out for providing light of said selected wavelengths; to provide simple and inexpensive apparatus which can be conveniently used for providing substantially pure light of said selected wavelengths; to provide such apparatus which can be adapted to function as a monochromator, as a bandpass filter or as a cut-off filter; to provide such filter apparatus which is adapted to effect relatively sharp cut-off of light other than light of said selected wavelengths; to provide such filter apparatus which can be adapted for variable operation to transmit light of any one selected wavelength or band of wavelengths from among a relatively wide range of wavelengths; and to provide such filter apparatus which is rugged, which has stable characteristics and which is compact in size.

Briefly described, the method of this invention for providing light of selected wavelengths includes the step of furnishing light-transmitting elements which are associated for forming at least one light-reflecting interface therebetween, the elements embodying materials having different dispersive powers and preferably having a common index of refraction for light of a selected wavelength. The method includes the further step of directing a beam of heterochromatic light, preferably a collimated beam of light, to be obliquely intercepted by said interface at a predetermined, selected angle or angles so that light of wavelengths at one side of the spectrum including light of the selected wavelength will be transmitted through the interface and light of other wavelengths at the opposite side of the spectrum will be totally reflected from the interface. As will be understood, each element will display a different refractive index for light of each different wavelength in accordance with the dispersive power of the element material so that, since the elements embody materials having different dispersive powers, the interface formed between the elements will represent a change of refractive index between the elements which will be of a different degree for light of each different wavelength. Thus light of said selected wavelength will find no change of refractive index at the interface and will be transmitted through the interface without deviation. Light of wavelengths at one side of the spectrum will find the interface representing a change of refractive index from a relatively low index to a relatively high index and will also be transmitted through the interface. On the other hand, light of wavelengths at the opposite side of the spectrum will find the interface representing a change of refractive index from a relatively high index to a relatively low index, light of certain of said wavelengths finding the change of index to be relatively large so that said light intercepted by the interface at a selected angle is totally reflected from said interface and light of others of said wavelengths finding the change of index at the interface to be relatively small so that said light, although intercepted by the interface at the same angle, is transmitted through the interface.

The apparatus provided by this invention comprises light-transmitting elements which are associated for forming at least one light-reflecting interface therebetween, the elements embodying materials having different dispersive powers and preferably having a common index of refraction for light of a selected wavelength. The elements are adapted to be disposed in the path of a beam of light, such as a collimated beam of heterochromatic light, with the interface or interfaces obliquely intercepting the light at a predetermined selected angle or angles so that light of wavelengths at one side of the spectrum including light of said selected wavelength can be transmitted through the interface and light of other wavelengths at the other side of the spectrum can be totally reflected from said interface and preferably can be conducted out of the path of said beam of light through one of the elements.

In one embodiment of the apparatus of this invention, the apparatus can comprise a pair of prisms which are adapted to form a single interface therebetween. Alternatively, three prisms can be arranged in sequence for forming two interfaces through which light can be directed in sequence, each interface being adapted to transmit light of at least said selected wavelength, respective interfaces being adapted to totally reflect light of certain wavelengths at respective opposite sides of the spectrum at either side of light of said selected wavelength. If desired, each interface can comprise a continuous interface defined by a series of connected surface portions of the elements which are interfitted with each other, the surface portions forming alternate interface portions which are adapted for intercepting said beam of light at said selected angles when the remaining interface portions extend in the direction of the beam of light.

In another alternative embodiment of this invention, there is provided a plurality of light-transmitting fibers which are disposed in spaced, side-by-side relation within a light-transmitting matrix or surround, the fibers and surround embodying materials having a common index of refraction for light of a selected wavelength and having different dispersive powers so that the peripheries of said fibers form a plurality of light-reflecting interfaces of the character above described. The fibers are adapted to receive light therein so that light of wavelengths at one side of the spectrum including light of said selected wavelength can be transmitted through the fiber interfaces and light of wavelengths at the other side of the spectrum can be totally reflected from said fiber interfaces to be conducted through said fibers. The fiber surround can comprise a liquid or can comprise fiber coatings which have been fused together in well known manner.

Other objects and advantages of the methods and apparatus provided by this invention will appear in the following description of particular embodiments of the invention, the description referring to the drawings in which:

FIG. 9 is a section view along the main axis of another alternative embodiment of this invention;

FIG. 10 is a section view along line 10—10 of FIG. 9; and

FIG. 11 is a partial section view similar to FIG. 9 to enlarged scale.

Figure 1:
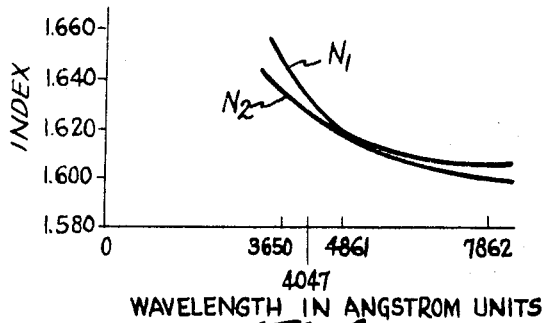
FIG. 1 is a graph illustrating the relationship of the refractive indices of light-transmitting materials utilized in one embodiment of this invention.
Figure 2:
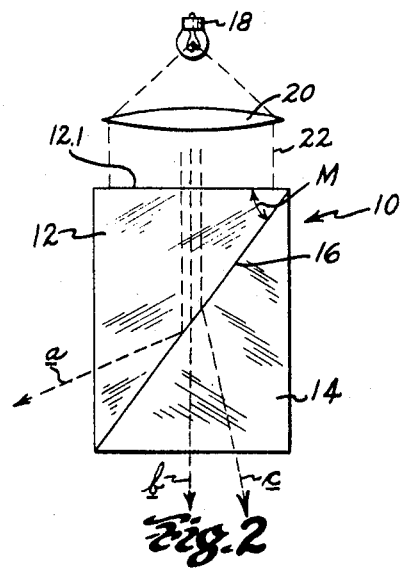
FIG. 2 is a side elevation view of one embodiment of this invention.

Referring to the drawings, FIGS. 1 and 2 illustrate a filter 10 provided by this invention, this embodiment of the invention being adapted to function as a cut-off filter. As shown, the filter 10 comprises a pair of light-transmitting elements 12 and 14 which are associated for forming a light-reflecting, optical interface 16 therebetween, the elements embodying materials which have different dispersive powers and which preferably have a common index of refraction for light of a selected wavelength. For example, the elements 12 and 14 can embody materials having refractive indices $N_1$ and $N_2$ respectively as indicated by the dispersion curves of FIG. 1. In this arrangement, the interface 16 represents a plane of change of refractive index between the elements, the change of index being of a different degree for light of each different wavelength. A light source 18, which is preferably of a type which can be considered as a point source of light, is adapted by means of a convenor or dispersion and therefore without altering its collimated beam of heterochromatic light, indicated at 22, to be obliquely intercepted by the interface 16 at a selected angle of incidence so that light of wavelengths at one side of the spectrum, including light of said selected wavelength, can be transmitted through the interface and light of other wavelengths at the opposite side of the spectrum can be totally reflected from the interface to be conducted out of the path of the light beam 22 through the element 12.

For example, the element 12 can comprise a prism of barium dense flint glass conventionally known as $BaSF_3$ which is adapted to display a refractive index $N_1$ of 1.634 for light of 4047 Angstrom units wavelength, of 1.618 for light of a selected wavelength of 4861 Angstrom units, and of 1.598 for light of 7682 Angstrom units wavelength as shown in FIG. 1. The element 14 can comprise a prism of dense crown glass conventionally known as SK1 which is adapted to display a refractive index $N_2$ of 1.629 for light of 4047 Angstrom units wavelength, of 1.618 for light of said selected wavelength of 4861 Angstrom units, and of 1.603 for light of 7682 Angstrom units wavelength as is also shown in FIG. 1. The prism 12 can be proportioned with an angle M of approximately 85°30′, for example, so that, when the prism surface 12.1 is disposed normal to the direction of the light beam 22, the light beam 22 is adapted to be transmitted through the surface 12.1 without deviation or dispersion and therefore without altering its collimated character, to be intercepted by the interface 16 at a single selected angle of incidence of 85°30′. In this arrangement, light of the selected wavelength of 4861 Angstrom units in the light beam 22 will not encounter a change of refractive index at the interface 16 and will pass through the transmitting mediums 12 and 14 and the interface 16 without deviation as indicated in FIG. 1 by the arrow $b$. Light of wavelengths at one side of the spectrum from light of said selected wavelength will find the interface 16 representing a change of refractive index of transmitting mediums from a relatively low refractive index in the element 12 to a relatively high refractive index in the element 14 and will be slightly refracted in being transmitted through the interface. For example, light of 7682 Angstrom units wavelength will encounter a change of refactive index at the interface 16 from the relatively low index of 1.598 in the prism 12 to the relatively high index of 1.603 in the prism 14 and will be transmitted through the interface as indicated by the arrow $c$ in FIG. 2. On the other hand, light of wavelengths at the opposite side of the spectrum from light of the selected wavelength will find the interface 16 representing a change of refractive index of transmitting mediums from a relatively high refractive index in the element 12 to a relatively low refractive index in the element 14. Where the angle of incidence of the light beam 22 upon the interface 16 is sufficiently large, light of certain wavelengths at said opposite side of the spectrum which find the change of index occuring at the interface to be relatively large can be totally reflected from the interface whereas light of other wavelengths at said opposite side of the spectrum which find said change of index at the interface 16 to be relatively small and which are intercepted by the interface at the same angle of incidence will be transmitted through the interface. For example, light of 4047 Angstrom units wavelength will find the interface 16 representing a change of refractive index of transmitting mediums from the relatively high index of 1.634 in the prism 12 to the relatively low index of 1.629 in the prism 14. In the above example, light of this wavelength is incident upon the interface 16 at an angle of 85°30′ which is the critical angle of incidence for achieving total reflection of said light from an interface formed by mediums of the noted refractive indices so that light of said wavelength is totally reflected from the interface to be conducted out of the path of the light beam 22 through the element 12 as indicated by the arrow $a$ in FIG. 1. As will be understood by reference to the graph of FIG. 1, light of wavelengths shorter than 4047 Angstom units wavelength will find a greater change of refractive index occurring at the interface 16 and will also be totally reflected from the interface whereas light of wavelengths longer than 4047 Angstrom units will find a smaller change of refractive index occurring at the interface 16 and will be transmitted through the interface. Thus the filter 10 is adapted to transmit substantially all light of wavelengths longer than 4047 Angstrom units through the interface 16 and to totally reflect substantially all light of wavelengths shorter than 4047 Angstrom units from said interface.

The terms "light" and "heterochromatic light" and words of similar import as used in the above description are intended to include all electromagnetic radiations including ultra-violet and infra-red radiations as well as visible light.

It will be understood that the element 12 could be proportioned with a different angle M so that the angle of incidence of the light beam 22 upon the interface 16 would be altered. Where said angle of incidence of the light beam 22 is decreased, the filter 10 would be adapted to transmit light of shorter wavelengths through the interface 16. Where said angle of incidence of the light beam 22 is increased, light of longer wavelengths up to light of said selected wavelength, light of 4861 Angstrom units wavelength in the above example, could be cut off by total reflection from the interface 16. The light source 18 and the collimating lens system 20 could also be adjustably mounted relative to the interface 16 by any conventional means for permitting adjustment of the angle of incidence of the light beam 22 on the interface 16 within the scope of this invention. Further, although the elements 12 and 14 have been described as comprising flint and crown glass prisms, it should be understood that many different light-transmitting materials including various vitreous materials, plastics and liquids could be embodied in different combinations in the manner above described for providing cut-off filters adapted to cut-off selected portions of the spectrum within the scope of this invention.

It should be noted that the elements 12 and 14 can be accurately machined for fitting closely together to form the optical interface 16 in conventional manner. Further, where the materials embodied in the elements have closely related coefficients of thermal expansion, the elements could be fused together in well known manner to form the interface 16. Also, the elements 12 and 14 could be secured together with a suitable optical cement for forming the interface 16 providing that the refractive index of the selected cement is equal to or greater than the refractive index of the material embodied in the element 12 for light of all wavelengths. Such a layer of cement between the elements is preferably relatively thin but should have sufficient thickness to avoid interference effects at the interface 16 as will be understood.

Figure 3:
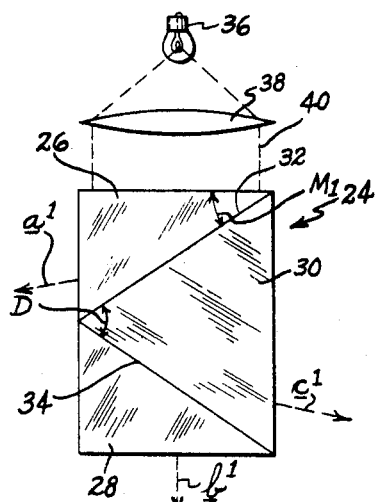
FIG. 3 is a side elevation view similar to FIG. 2 illustrating an alternative embodiment of this invention.

Another embodiment 24 of the filter of this invention is illustrated in FIG. 3, this embodiment of the invention being adapted to function as a band-pass filter or monochromator as desired. As shown, the filter 24 comprises three light-transmitting elements 26, 28 and 30 which are arranged in sequence for forming a pair of light-reflecting optical interfaces 32 and 34. The light-transmitting elements are associated so that the interfaces 32 and 34 can be disposed in sequence within the path of a beam of light, each interface being adapted to intercept said light beam at a selected angle of incidence. The elements embody materials having a common index of refraction for light of a selected wavelength, and the central element 30 of the sequence is adapted to have a dispersive power which differs from the dispersive power of the outer elements 26 and 28 of the sequence. A light source 36 is adapted by means of a collimating lens system 38 to direct a collimated beam of heterochromatic light, indicated at 40, to be obliquely intercepted by the interfaces 32 and 34 at selected angles of incidence so that light of certain wavelengths including light of said selected wavelength can be transmitted through said interfaces, light of certain wavelengths at one side of the spectrum from light of said selected wavelength can be totally reflected from the interface 32, and light of certain wavelengths at the opposite side of the spectrum can be totally reflected from the interface 34.

For example, the elements 26 and 28 can comprise flint glass prisms like the prism 12 described with reference to FIG. 2 and the element 30 can comprise a crown glass prism similar to the prism 14 described with reference to FIG. 2. The prism 26 can be proportioned with an angle $M_1$ of 85°30′ and the prism 30 can be proportioned with an angle D of 168°45′. In this arrangement, the light beam 40 will be incident upon the interface 32 at an angle of 85°30′ so that light of 4047 Angstrom units wavelength and light of shorter wavelengths will be totally reflected from the interface 32 to be conducted out of the path of the light beam 40 in the manner previously described as indicated by the arrow $a^1$ in FIG. 3. Light of all other wavelengths will be transmitted through the interface 32, light of the selected wavelength of 4861 Angstrom units being undeviated at the interface. This transmitted light is then intercepted by the interface 34. Light of the selected wavelength of 4861 Angstrom units will again encounter no change of refractive index at the interface 34 and will be transmitted through that interface without deviation as indicated by the arrow $b^1$ in FIG. 3. However, light of other wavelengths will be slightly refracted to different extents in being transmitted through the interface 32 and therefore will be incident upon the interface 34 at various angles. Where the element 30 is proportioned with the above-described angles, light of 7682 Angstrom units wavelength, for example, will be incident upon the interface 34 at an angle of 85°15′, and will encounter a change of refractive index at that interface from the relatively high index of 1.603 in the element 30 to the relatively low index of 1.598 in the element 28. Therefore, in accordance with Snell's Law, light of this wavelength is intercepted by the interface 34 at the critical angle of incidence for achieving total reflection therefrom and will be totally reflected from the interface and conducted out of the path of the light beam 40 as indicated by the arrow $c^1$ in FIG. 3. Light of wavelengths longer than 7682 Angstrom units will be refracted to a greater extent at the interface 32 and will therefore be intercepted by the interface 34 at a greater angle of incidence. Light of said longer wavelengths will also encounter a greater change of refractive index at the interface 34 and therefore will also be totally reflected therefrom. Light of wavelengths shorter than 7862 Angstrom units will be refracted to a lesser extent at the interface 32, will be incident upon the interface 34 at a smaller angle, and will encounter a smaller change of index at the interface 34 and will therefore be transmitted through the interface 34 as will be understood. Thus the filter 24 is adapted to transmit light of wavelengths between 4047 and 7682 Angstrom units through both interfaces 32 and 34 and is adapted to cut off light of shorter and longer wavelengths by total reflection from respective interfaces. Of course, the interfaces could be arranged to intercept the light beam 40 at greater angles of incidence as previously described and could be thereby adapted to transmit light of substantially a single wavelength as will be understood.

Figure 4:
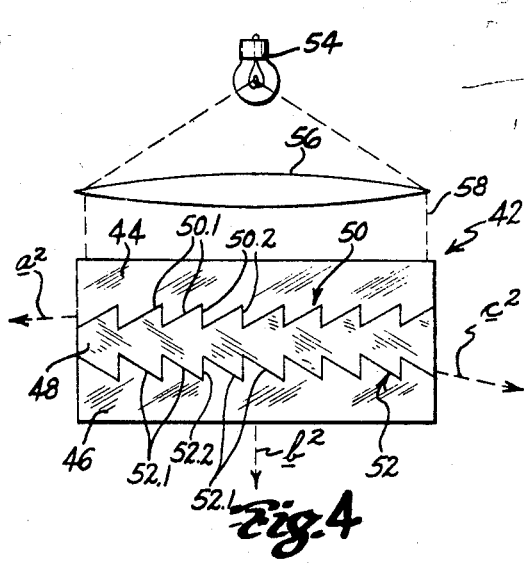
FIG. 4 is a side elevation view similar to FIGS. 2 and 3 illustrating another alternative embodiment of this invention.
Figure 5:
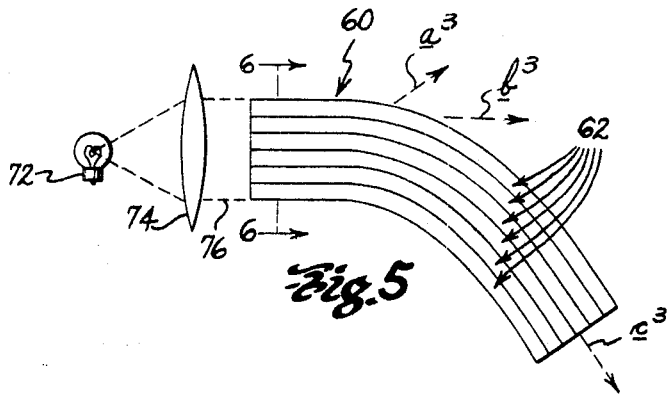
FIG. 5 is a side elevation view of another alternative embodiment of this invention.
Figure 6:
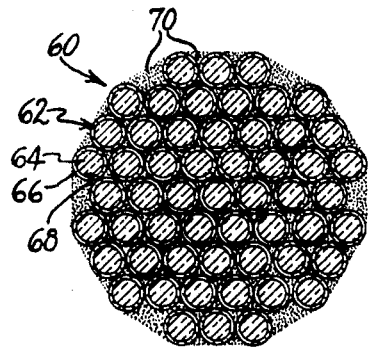
FIG. 6 is a section view along line 6—6 of FIG. 5.
Figure 7:
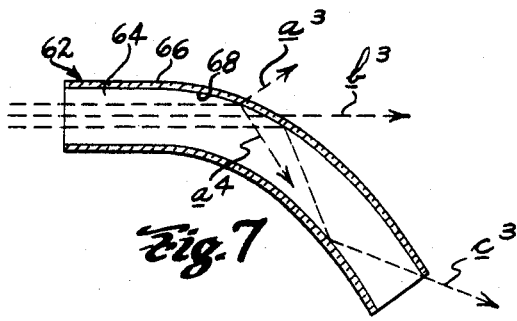
FIG. 7 is an enlarged section view of a fiber embodied in the filter of FIG. 5.

Another embodiment of the filter of this invention is indicated at 42 in FIG. 4, this embodiment comprising a more compact filter which is otherwise similar to the filter 24 described with reference to FIG. 3. This filter comprises three light-transmitting elements 44, 46 and 48 embodying materials which have refractive indices and dispersive powers corresponding to those of the elements 26, 28 and 30 respectively as described with reference to FIG. 3, the elements being arranged to form two interfaces 50 and 52 therebetween. A light source 54 is adapted by a lens system 56 to direct a collimated beam of light 58 to be intercepted by the interfaces 50 and 52. The interfaces 50 and 52 correspond in function to the interfaces 32 and 34 respectively of the filter 24 described above. However, in this embodiment of the invention, alternate portions 50.1 and 52.1 of the respective interfaces are disposed to intercept the light beam 58 at selected angles, portions 50.2 and 52.2 of the respective interfaces between said alternate portions being adapted to extend in the direction of the light beam 58. In this arrangement, the portions 50.1 of the interface 50 cooperate to inferrupt all light of the light beam 58 at a single selected angle of incidence and the portions 52.1 of the interface 52 cooperate to intercept substantially all light transmitted through the interface 50. Thus the alternate portions 50.1 and 52.1 of the interfaces 50 and 52 are adapted to function in the manner of the interfaces 32 and 34 previously described, light of wavelengths shorter than 4047 Angstrom units being totally reflected from the interface portions 50.1 as indicated by the arrow $a^2$ in FIG. 4, light of wavelengths longer than 7682 Angstrom units wavelength being totally reflected from the interface portions 52.1 as indicated by the arrow $c^2$ in FIG. 4, and light of the selected wavelength and other wavelengths between 4047 and 7682 Angstrom units being transmitted through the interfaces 50 and 52 as indicated by the arrow $b^2$ in FIG. 4. Light reflected from the interface portions 50.1 and 52.1 will tend to be intercepted by the other interface portions 50.2 and 52.2 respectively as will be understood but will be transmitted through said interface portions without significant deviation from the general directions indicated by the arrows $a^2$ and $c^2$. It should be noted that the interface portions 50.2 and 52.2 need not be aligned with each other. In forming the filter 42, the elements 44, 46 and 48 can be secured together for forming the optical interfaces 50 and 52 in the manner described above with reference to the interface 16. Such a filter can also be conveniently manufactured by scribing or grinding the elements 44 and 46 to the illustrated configuration in any well known manner and by employing an element 48 of a liquid light-transmitting material which will fit closely against the elements 44 and 46 to form the stepped optical interfaces 50 and 52.

Another embodiment of the filter of this invention is indicated at 60 in FIGS. 5–8, this embodiment of the invention being adapted to function as a cut-off filter. As shown, the filter 60 preferably comprises a plurality of fibers 62 each having a light-transmitting core 64 and a light-transmitting cladding 66, the materials embodied in the fiber cores and claddings having different dispersive powers and preferably having a common refractive index for light of a selected wavelength. In this arrangement, the core and cladding of each filter is adapted to form a light-reflecting, optical interface 68 therebetween which functions in a manner similar to the interface 16 described with reference to FIG. 1. Fibers of this character can be formed in a drawing process or in any other well-known manner and can be assembled in side-by-side bundled relation. The fibers can be secured in bundled relation by means of a suitable adhesive 70 as shown or, if desired, the fiber claddings 66 can be fused together in well known manner. The fibers can be bundled together to form a curved filter as illustrated or can be used to form a straight fiber bundle as will be understood. A light source 72 is adapted by means of a suitable lens system 74 to direct a collimated beam of heterochromatic light, indicated at 76, within the fibers to be obliquely intercepted by the fiber interfaces 68 so that light at one side of the spectrum including light of said selected wavelength will be transmitted through the fiber interfaces exteriorly of the bundle periphery and light of wavelengths at the opposite side of the spectrum will be totally reflected from said interfaces to be connected through the fibers and projected from the opposite ends thereof.

Figure 8:
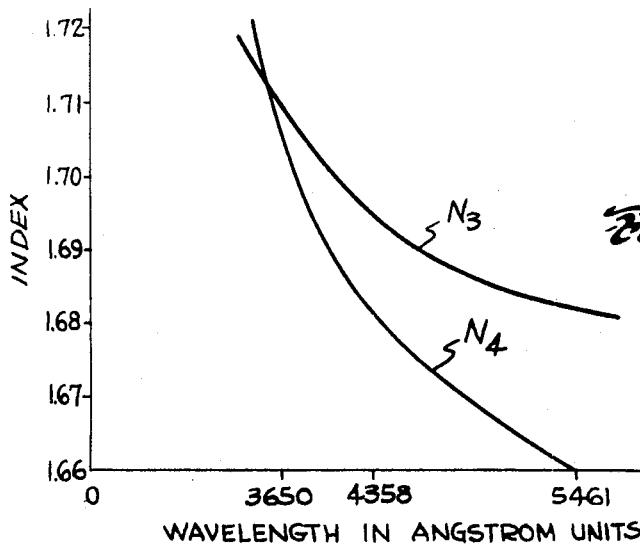
FIG. 8 is a graph similar to FIG. 1 illustrating the refractive indices of materials embodied in the filter of FIG. 5.

For example, the fiber cores 64 can be formed of Lanthanum dense crown glass conventionally known as LaK2 having a refractive index $N_3$ of 1.693 for light of 4358 Angstrom units wavelength and of 1.708 for light of a selected wavelength of 3650 Angstrom units as shown in FIG. 8. The fiber claddings 66 can be formed of a dense crown glass conventionally known as SK9 having a refractive index $N_4$ of 1.680 for light of 4358 Angstrom units wavelength and of 1.708 for light of the selected wavelength of 3650 Angstrom units as shown in FIG. 8. The lens system 74 can be adapted to direct light within the fibers 62 so that substantially all light in the beam 76 is obliquely intercepted by the fiber interfaces 68 at an angle of incidence equal to or greater than 84°55' in well known manner. In this arrangement, light of 3650 Angstrom units wavelength, as well as light of shorter wavelengths will be transmittted through the fiber interfaces in the manner previously described as indicated by the arrow $b^3$ in FIG. 7. Light of 4358 Angstrom units wavelength, as well as light of longer wavelengths, will be totally reflected from the interfaces 68 a repeated number of times to be conducted out of the fibers at the opposite ends thereof as indicated by the arrow $c^3$ in FIG. 7. Light of wavelengths between 3650 and 4358 Angstrom units which is incident upon the interfaces 68 at angles of 84°55' or larger will be transmitted through or reflected from the fiber interfaces 68 in accordance with the relationship between said angles of incidence and the change of refractive index represented by the interfaces for light of said wavelengths, as indicated by the arrows $a^3$ and $a^4$ in FIG. 7. Thus the filter 60 is adapted to effect substantially complete transmission of light of 4358 Angstrom units wavelength and longer wavelengths, to effect substantially complete cut-off of light of 3650 Angstrom units wavelength and shorter wavelengths, and for partial transmission of light of wavelengths between 3650 and 4358 Angstrom units. It should be noted that the fibers 62 can have any desired cross-sectional configuration within the scope of this invention, round fibers as illustrated being of economical manufacture and square fibers being adapted for more accurate control of the angle at which the interfaces of such fibers can intercept the light beam 76.

Another embodiment of the filter of this invention is indicated at 78 in FIGS. 9–11, this embodiment of the invention being adapted to function as a monochromator. As shown, the filter 78 comprises a plurality of light-transmitting fibers 80 which are arranged in spaced side-by-side relation at one end 80.1 for defining a substantially planar face and which extend obliquely from said face toward the opposite ends 80.2 of the fibers. The fibers are surrounded by another light-transmitting element 82, preferably a fluid as shown, for forming the interfaces 84 between the fibers and their surround. The fibers and the surround embody materials which have different dispersive powers and which have a common index of refraction for light of a selected wavelength. A light source 86 is adapted by means of a lens system 88 to direct a collimated beam of heterochromatic light, indicated at 90, to be received within the fibers 80 and within interstices 92 between the fibers and to be obliquely intercepted by the interfaces 84 between the fibers and their surround.

A suitable structure by which the fibers 80 and the surround 82 can be arranged as above described is shown in FIGS. 9–11. Thus a suitable container 94 of cylindrical shape for example can be provided with windows 96 and 98 at the opposite ends thereof and can be provided with a peripheral window 100 as shown, the windows being sealed in airtight relation to the container in any suitable manner. The fibers 82 can be secured to the window 96 for holding the fibers in spaced relation and can also be secured at their opposite ends to the peripheral window 100 with a suitable adhesive. Only a few fibers 82 are shown in the drawings for convenience of illustration, but a great number of such fibers of approximately 0.010 inch in diameter, for example, would preferably be used.

The fibers 80 could be formed of borosilicate crown glass, for example, having a refractive index of 1.520 for light of 5000 Angstrom units wavelength, of 1.518 for light of a selected wavelength of 5300 Angstrom units, and of 1.516 for light of 6000 Angstrom units wavelength at a temperature of 25° C. The surround 82 could comprise a solution of carbon disulfide in benzene having a refractive index of 1.525 for light of 5000 Angstrom units wavelength, of 1.518 for light of the selected wavelength of 5300 Angstrom units, and of 1.508 for light of 6000 Angstrom units wavelength at 25° C. As will be understood from the filters previously described, light of 5300 Angstrom units wavelength received within the fibers 80 or within the interstices 92 between the fibers will be intercepted by a large number of the interfaces 84 but will be transmitted through said interfaces without deviation as indicated by the arrow $b^5$ in FIGS. 9 and 11. Some light of certain wavelengths at one side of the spectrum received within the fibers 80 will be intercepted by interfaces 84 at suitable angles to be totally reflected from the interfaces and conducted through the fibers to be projected through the window 100 as indicated by the arrow $a^5$ in FIGS. 9 and 11. Other light at said side of the spectrum and light of wavelengths at the opposite side of the spectrum, however, will be refracted in being transmitted through the interfaces as will be understood. In being transmitted through a series of said interfaces 84, such light will be repeatedly refracted in such a manner as to be directed generally outward from the center of the filter 78 as indicated in FIG. 11 by the arrow $c^5$. Further, such light will intercept interfaces 84 at various angles and so will be projected through the window 98 at various angles. Light received within the interstices 92 between the fibers will also be intercepted by interfaces 84 but will be refracted or reflected in converse manner. Some light of certain wavelengths at said opposite side of the spectrum will be totally reflected from said interfaces and will tend to be conducted through the interstices to be projected through the window 100 as indicated by the arrow $c^6$ in FIGS. 9 and 11. Of course, other light received within the interstices 92 will be repeatedly refracted at interfaces 84 in a manner similar to that described with reference to the arrow $c^5$ in FIGS. 9 and 11. Thus the filter 78 is adapted to transmit substantially all light of the selected wavelength through the window 98, such light retaining its collimated character. A substantial part of the light of other wavelengths in the light beam 90 will be totally reflected from interfaces 84 to be conducted through the fibers 80 or interstices 92 to be projected through the filter window 100. The remaining light of other wavelengths will be deviated outwardly from the center of the filter 78 and will be directed through the window 98 at various angles. A conventional lens system 102 can be adapted to focus collimated light projected through the filter window 98 upon the aperture 104.1 of any conventional light stop means 104, in well known manner. In this manner, a substantial part of light of a single wavelength propagated by the light source 86 can be separated from other light from said source and can be directed upon a target such as is diagrammatically indicated at 106 in FIG. 9.

The fibers 80 and the surround 82 in the filter 78 are adapted to have a common index of refraction for light of a selected wavelength as described above. Where the surround comprises a liquid, the temperature of the fibers and surround must be closely regulated to maintain the refractive indices of the fibers and surround in the desired relation. For this purpose, the filter 78 can be provided with a heater means 108 such as the heater coil which is diagrammatically indicated in FIG. 9 and which is adapted to be connected to a suitable power source as indicated by the terminals 110. The heater means 108 can also be used for altering the temperature at which the fibers and surround are maintained, whereby, since the fibers and the liquid surround are adapted to change their refractive indices at different rates during such a temperature change, the fibers and surround can be adapted to display a common index of refraction for light of a different selected wavelength so that the filter 78 can be adapted to provide monochromatic light of said different selected wavelength.

Although particular embodiments of the methods and apparatus provide by this invention have been described for the purposes of illustration, it should be understood that this invention includes all modifications and equivalents thereof which fall within the scope of the appended claims.

Having described my invention, we claim:

1. A cut-off filter comprising a light-conducting fiber embodying a light-transmitting core and a light-transmitting material surrounding said core, said core and surrounding material forming a light-reflecting interface therebetween, said core and surrounding material being formed of materials having a common index of refraction for light of a selected wavelength and having substantial, different, dispersive powers such that light can be directed into the fiber core from one end thereof to be obliquely intercepted by said interface at selected angles so that light of at least said selected wavelength can be transmitted through said interface exteriorly of the core and light of other selected wavelengths can be totally reflected a multiplicity of times from said interface to be conducted through the core and projected from the opposite end thereof, said fiber being elongated and being curved longitudinally in the direction of its length and having its ends oriented relative to said surrounding material and to each other for receiving light projected along a predetermined light path at said one end and for projecting light conducted through said fiber from said opposite fiber end out of said light path.

2. A cut-off filter comprising a plurality of light-conducting fibers each embodying a light-transmitting core and a light-transmitting cladding which form a light-reflecting interface therebetween, each of said cores and its respective cladding having a common index of refraction for light of a selected wavelength and having substantial, different, dispersive powers so that, when light is directed within the fiber cores from one end thereof to be obliquely intercepted by said interfaces at selected angles, light of at least said selected wavelength can be transmitted through said interfaces exteriorly of the bundle and light of other selected wavelengths at one side of the spectrum from said selected wavelength can be totally reflected from said interfaces a multiplicity of times to be conducted through said cores and projected from the opposite ends of said cores, said fibers being elongated and being curved longitudinally in the direction of their lengths in substantially the same direction intermediate their ends for receiving light projected along a predetermined light path at said one end of each fiber and for projecting light conducted through said fiber core from said opposite end of each fiber out of said light path to increase separation of said reflected and transmitted light.

3. A filter system comprising a light-conducting fiber embodying a light-transmitting core and a light-transmitting cladding, said core and cladding forming a light-reflecting interface therebetween, said core and cladding being formed of materials having a common index of refraction for light of a selected wavelength and having substantial, different, dispersive powers, and means for directing a collimated beam of heterochromatic light along a predetermined light path into the fiber core from one end thereof to be obliquely intercepted by said interface at selected angles so that light of at least said selected wavelength can be transmitted through said interface exteriorly of the core and light of other selected wavelengths can be totaly reflected from said interface a multiplicity of times to be conducted through the core and projected from the opposite end thereof, said fiber being elongated, being curved longitudinally in the direction of its length and being oriented relative to said predetermined light path to project said totally reflected light conducted by said fiber core out of said light path.

4. A system for providing light of selected wavelengths, said system comprising means for directing a collimated beam of heterochromatic light along a predetermined path, a plurality of light-transmitting fibers mounted in spaced side-by-side relation at one end in the path of said beam of light for receiving said light within the fibers and within interstices between the fibers at one end thereof, a light-transmitting fluid disposed in surrounding relation to said fibers for filling interstices therebetween and for forming light-reflecting interfaces between the fibers and fluid, said fibers being elongated and being curved longitudinally in the direction of their lengths to extend obliquely out of the path of said beam of light at their opposite ends and so that said interfaces are adapted to obliquely intercept said light at selected angles, said fibers and fluid having a common index of refraction for light of a selected wavelength and having substantial, different, dispersive powers so that a substantial part of the light received within said fibers and interstices of wavelengths at respective sides of the spectrum from light of said selected wavelength can be totally reflected from said interfaces to be conducted out of the path of said beam of light through said fibers and interstices respectively, the remaining light of wavelengths at either side of the spectrum from light of said selected wavelength can be variously refracted as it is transmitted through said interfaces, and light of said selected wavelength can be transmitted through said interfaces without substantial change of direction, light-stop means having a restricted aperture therein, and means for directing light rays of said selected wavelength transmitted through said interfaces and other light rays parallel thereto through said aperture, thereby to provide a beam of light comprised substantially of light of said selected wavelength.

5. A system as set forth in claim 4 including means for heating said fluid and fibers to selected temperatures whereby the refractive indices of said fluid and fibers can be adjusted to have a common index of refraction for light of any one of a range of different wavelengths.

References Cited by the Examiner

UNITED STATES PATENTS

| | | | |
|---|---|---|---|
| 2,176,837 | 10/1939 | Ellis. | |
| 2,211,238 | 8/1940 | Links | 88—106 X |
| 2,311,613 | 2/1943 | Slayter. | |
| 2,447,828 | 8/1948 | West | 88—65 |
| 2,483,244 | 9/1949 | Stamm | 88—1 |
| 2,825,260 | 3/1958 | O'Brien | 88—1 |
| 3,051,038 | 8/1962 | Duke | 88—1 X |
| 3,062,103 | 11/1962 | Bolz | 88—107 |

FOREIGN PATENTS

| | | |
|---|---|---|
| 1,167,336 | 7/1958 | France. |
| 1,082,429 | 5/1960 | Germany. |

OTHER REFERENCES

Strong: Concepts of Classical Optics, textbook published in 1958, pp. 583–585.

DAVID H. RUBIN, *Primary Examiner.*

EMIL G. ANDERSON, *Examiner.*